United States Patent
Horne

(10) Patent No.: US 6,798,825 B1
(45) Date of Patent: *Sep. 28, 2004

(54) METHOD FOR USING CIRCULAR SPREADING CODES TO ACHIEVE HIGH BIT DENSITIES IN A DIRECT-SEQUENCE SPREAD SPECTRUM COMMUNICATION SYSTEM

(75) Inventor: David M. Horne, Chandler, AZ (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/491,690

(22) Filed: Jan. 26, 2000

Related U.S. Application Data

(63) Continuation of application No. 09/491,690, filed on Jan. 26, 2000, which is a continuation of application No. 09/002,749, filed on Jan. 5, 1998, now Pat. No. 6,026,118.

(51) Int. Cl.[7] .............................................. H04B 1/707
(52) U.S. Cl. ...................................... 375/146; 375/130
(58) Field of Search ............................... 375/140, 141, 375/130, 146

(56) References Cited

U.S. PATENT DOCUMENTS

| | | | |
|---|---|---|---|
| 3,934,203 A | | 1/1976 | Schiff |
| 5,144,641 A | * | 9/1992 | Akazawa et al. ............ 375/130 |
| 5,315,616 A | * | 5/1994 | DeLisle et al. .............. 375/140 |
| 5,423,001 A | * | 6/1995 | Ueda ........................... 395/200 |
| 5,432,814 A | * | 7/1995 | Hasegawa ................... 375/202 |
| 6,064,695 A | * | 5/2000 | Raphaeli ..................... 375/130 |

FOREIGN PATENT DOCUMENTS

| | | |
|---|---|---|
| EP | 0782288 A2 | 7/1997 |
| FR | 2534096 | 10/1982 |
| JP | 09130299 A * | 5/1997 |

* cited by examiner

*Primary Examiner*—Temesghen Ghebretinsae
(74) *Attorney, Agent, or Firm*—Blakely, Sokoloff, Taylor & Zafman LLP

(57) ABSTRACT

A method for achieving high bit densities in a direct-sequence spread spectrum communication system by using circular spreading codes. The circular spreading code is a pseudo-noise spreading code that is shifted by n. This circular pseudo-noise spreading code is then used to spread an information signal by modulating the information signal with the circular pseudo-noise spreading code. The same circular pseudo-noise spreading code is also used to demodulate the signal. The value of n used is that which corresponds to the value of the signal to be spread.

9 Claims, 4 Drawing Sheets

METHOD FOR USING CIRCULAR SPREADING CODES TO ACHIEVE HIGH BIT DENSITIES IN A DIRECT-SEQUENCE SPREAD SPECTRUM COMMUNICATION SYSTEM

This is a continuation of application Ser. No. 09/491,690, filed Jan. 26, 2000, which is a continuation of application Ser. No. 09/002,749, filed Jan. 5, 1998 now U.S. Pat. No. 6,026,118.

FIELD OF THE INVENTION

The present invention relates to the field of data communications. More particularly the invention describes a method of using circular spreading codes to achieve high bit densities in direct sequence spread spectrum communication systems.

BACKGROUND OF THE INVENTION

Direct Sequence Spread Spectrum (DSSS) techniques rely on the use of pseudo-noise carriers, also called spreading codes, spreading sequences, code sequences and chip sequences, and a transmission bandwidth which is much wider than the minimum required to transmit the information. The transmitter spreads the information by modulating the information with a pseudo-noise spreading sequence. At the receiver, the information is despread to recover the base information. This despreading is accomplished by correlating the received, spread-modulated, signal with the spreading sequence used for the transmission. DSSS is sometimes referred to by the shorthand name "direct spread".

The modulating signal, such as a pseudo-random spreading code signal, possesses a chip rate (analogous to carrier frequency) which is much larger than the data rate of the information signal. This characteristic is required for efficient spreading. Each state of the pseudo-random spreading sequence is referred to as a chip. The spreading sequence (chip sequence) directly modulates each bit of the information signal, hence the name direct spread. Pseudo-randomness of the spreading signal is required in order to recover the original information signal. Since the spreading sequence is deterministic, it can be exactly duplicated at the receiver in order to extract the information signal. If it were truly random, extraction of the information signal via correlation receiver would not be possible.

The spreading operation causes the signal power to be depleted uniformly across the spread bandwidth. Thus, the spread spectrum signal will appear buried in noise to any receiver without the despreading signal. Consequently, it is not only difficult to jam, but is also difficult to detect its presence in any bandwidth. Any undesired signal picked up during transmission is spread by the receiver in the same way that the transmitter spread the desired signal originally. In other words, the receiver spreads undesired signals picked up during transmission, while simultaneously despreading, or demodulating, the desired information signal. Processing gain is the term used to express this interference suppression in the overall transmit/receive operation. When viewed as a transmit/receive operation, the desired signal is spread-modulated twice, giving back the original signal, while in-band interference is spread-modulated once, and thereby depleted across the full spread bandwidth.

SUMMARY OF THE INVENTION

A method for achieving high bit densities in a direct-sequence spread spectrum communication system by using circular spreading codes. The circular spreading code is a pseudo-noise spreading code that is shifted by n. This circular pseudo-noise spreading code is then used to spread an information signal by modulating the information signal with the circular pseudo-noise spreading code. The same circular pseudo-noise spreading code is also used to demodulate the signal. The value of n used is that which corresponds to the value of the signal to be spread.

BRIEF DESCRIPTION OF THE DRAWINGS

The present invention is illustrated by way of example and not limitation in the figures of the accompanying drawings, in which like references indicate similar elements and in which:

FIG. 1(*b*) is a diagram showing a spread signal with interference being demodulated into the original signal and noise.

FIG. 2(*b*) is an exemplary method of spreading signals using a circular pseudo-noise spreading code.

DETAILED DESCRIPTION OF THE INVENTION

The disclosed technique utilizes a previously unexploited method of embedding multi-bit information content in the spreading code, via intra-symbol rotation. This circular rotation of the spreading code provides increase information capacity through a mapping of user data to rotation angle. In this manner, the excess bandwidth inherent to spread spectrum modulation is exploited for an information capacity increase, without sacrificing benefits of spread spectrum techniques. This information capacity increase is achieved without any accompanying increase in the transmit power or bandwidth.

By encoding the spreading code through circular rotation within the bounds of a symbol period, multi-bit information capacity is created. This is done through the rotation of the spreading code where the rotation angle is used to encode the user data information. The number of bits represented by a given rotation is equal to log-base-2 of the spreading code length. Implementation is relatively simple and the benefits of the spread spectrum technique are preserved.

By storing a given spreading code in, for example, a circular shift register or ring buffer, and reading the register each symbol period, starting from a pointer location determined by the user data, additional information is embedded in the rotated spreading code. Each pointer increment corresponds to a rotation angle of 360 degrees divided by the log-base-2 of the length of the spreading code. The rotated spreading code at the ring buffer output is then used to modulate user data, as in a conventional direct-sequence spread spectrum modulator.

Figure 1A:
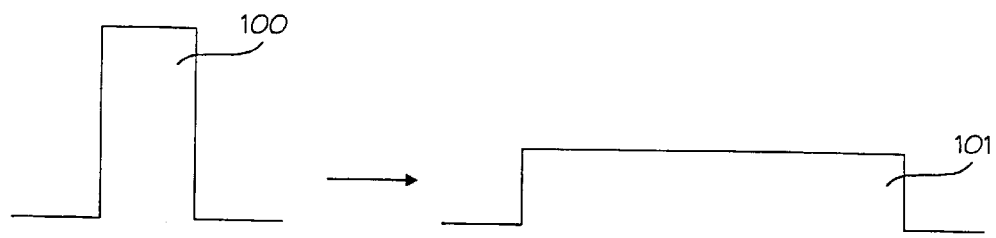
FIG. 1(*a*) is a diagram showing a signal being spread.
Figure 1B:
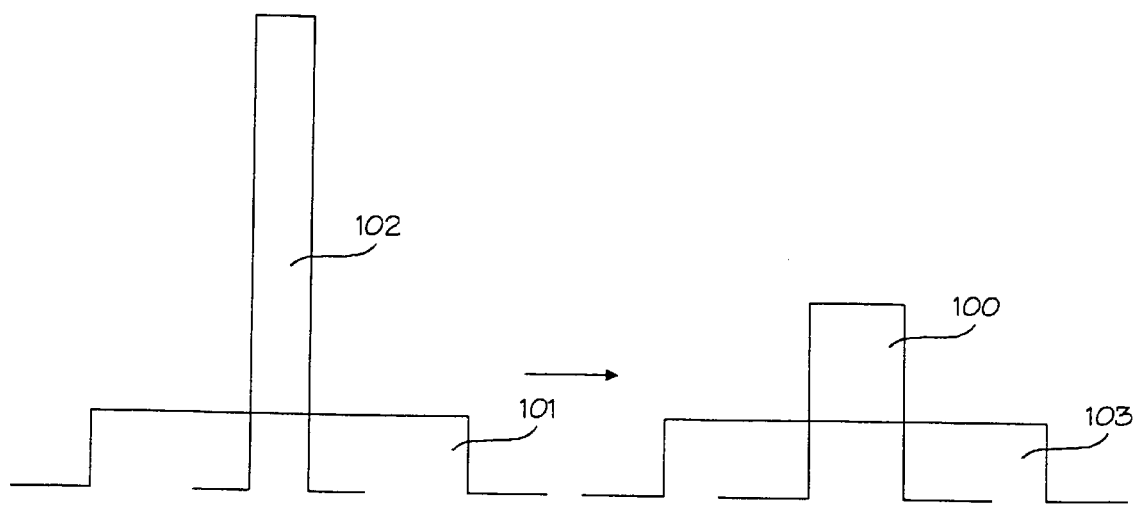

FIG. 1(*a*) shows an example of what occurs to a signal when it is spread. Signal 100 is spread using a spreading sequence (not shown) into signal 101. As can be seen, the amplitude of the signal is decreased, while its bandwidth is expanded. By reducing the amplitude, the signal will appear indistinguishable from noise, and can only be recovered by a receiver which processes the correct spreading sequence. FIG. 1 (*b*) shows the spread signal 101 and an interference signal 102 which has been picked up during transmission. When the spread modulated signal 101 is demodulated by using the original spreading sequence (not shown), the original signal 100 is recovered and the interference signal 102 is spread into signal 103, thereby being reduced to noise.

Figure 2A:
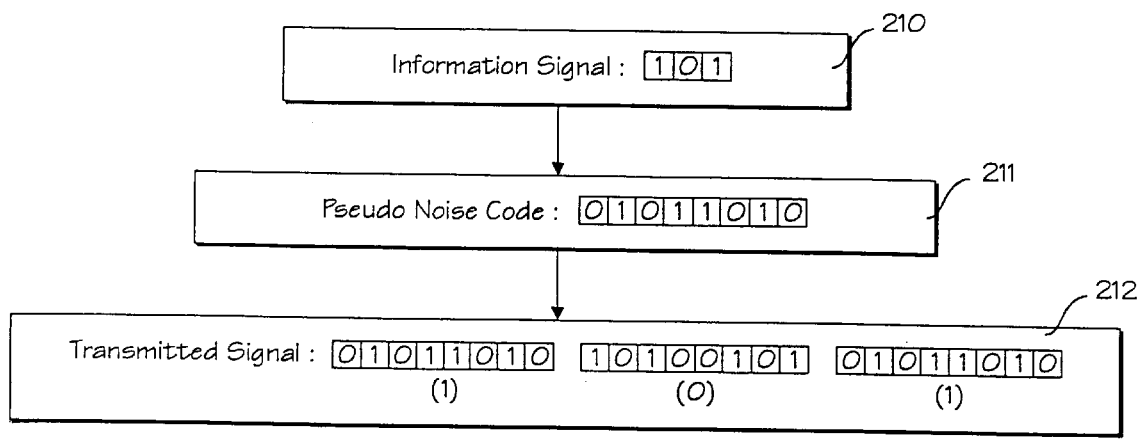
FIG. 2(*a*) is an exemplary prior art method of spreading signals.

FIG. 2(a) is a diagram of an exemplary prior art method of spreading a signal. An information signal 210 is modulated, using known methods, by a pseudo-noise code 211. For each '1' in the information signal, the pseudo-noise code 211 is transmitted. Whereas for each '0' in the information signal, the inverse of the pseudo-noise code 211 is transmitted. Thus, through such modulation, the signal is spread out for transmission into the transmitted signal 212. For example, if the information signal 210 consists of the bits '101' and the pseudo-noise code 211 is '01011010' then the transmitted signal 212 is '01011010 10100101 01011010'. This transmitted signal is created by '1' corresponding to the pseudo-noise code 211 ('010110101') and '0' corresponding to the inverse of the pseudo-noise code ('10100101').

Figure 2B:
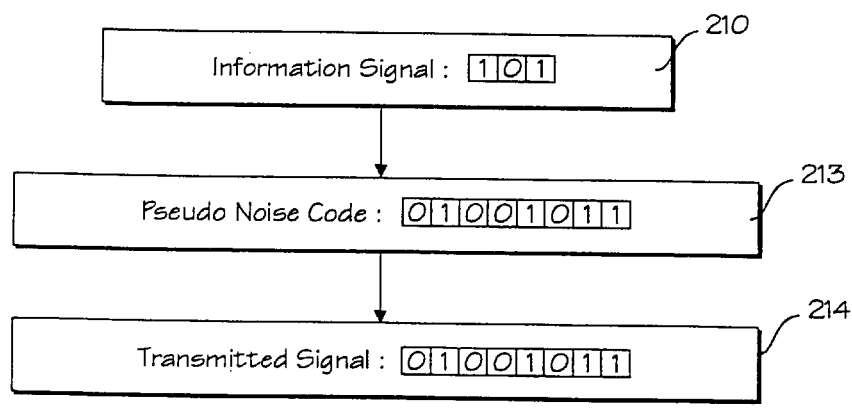

FIG. 2(b) is a diagram of an exemplary method of spreading a signal using a circular pseudo-noise spreading code. As described above, the information signal 210 is again modulated by a spreading signal to create a transmitted signal 214. However, in this case, instead of using a pseudo-noise code, a circular pseudo-noise spreading code is used. By using a circular pseudo-noise spreading code, multiple bits of information can be transmitted per each pseudo-noise code instead of a single bit, as described above. The circular pseudo-noise spreading code is a shifted pseudo-noise code. For example, if the circular spreading code was '01011010' then the code shifted by zero is still '01011010'. However, the code shifted by one is '101 10100' where the second bit of the original spreading code is now the first bit, the third bit is now the second, etc., until the last bit is the first bit. As a trivial example, if two bits of information are to be sent per each pseudo-noise code, a four bit pseudo-noise code is required because two bits of information have a value ranging from zero to three. If the value of the information bits is 3 (the bits are '11'), then the pseudo noise code is shifted by three, thus the circular spreading code used begins with the fourth bit, or bit number 3 where the bits are numbered zero through three. This scheme results in high bit densities of transmitted data while still containing high correlation.

In FIG. 2(b), the same information signal 210 ('101') and pseudo-noise code 211 ('01011010') of FIG. 2(a) is used. In this case, since a binary '101' equals a numeric 5, the circular pseudo-noise spreading code used is '01001011', where the circular pseudo-noise code is original pseudo-noise code shifted by five. Thus, the circular pseudo-noise code corresponds to '101' and the transmitted signal is therefore '01001011'.

Figure 3:
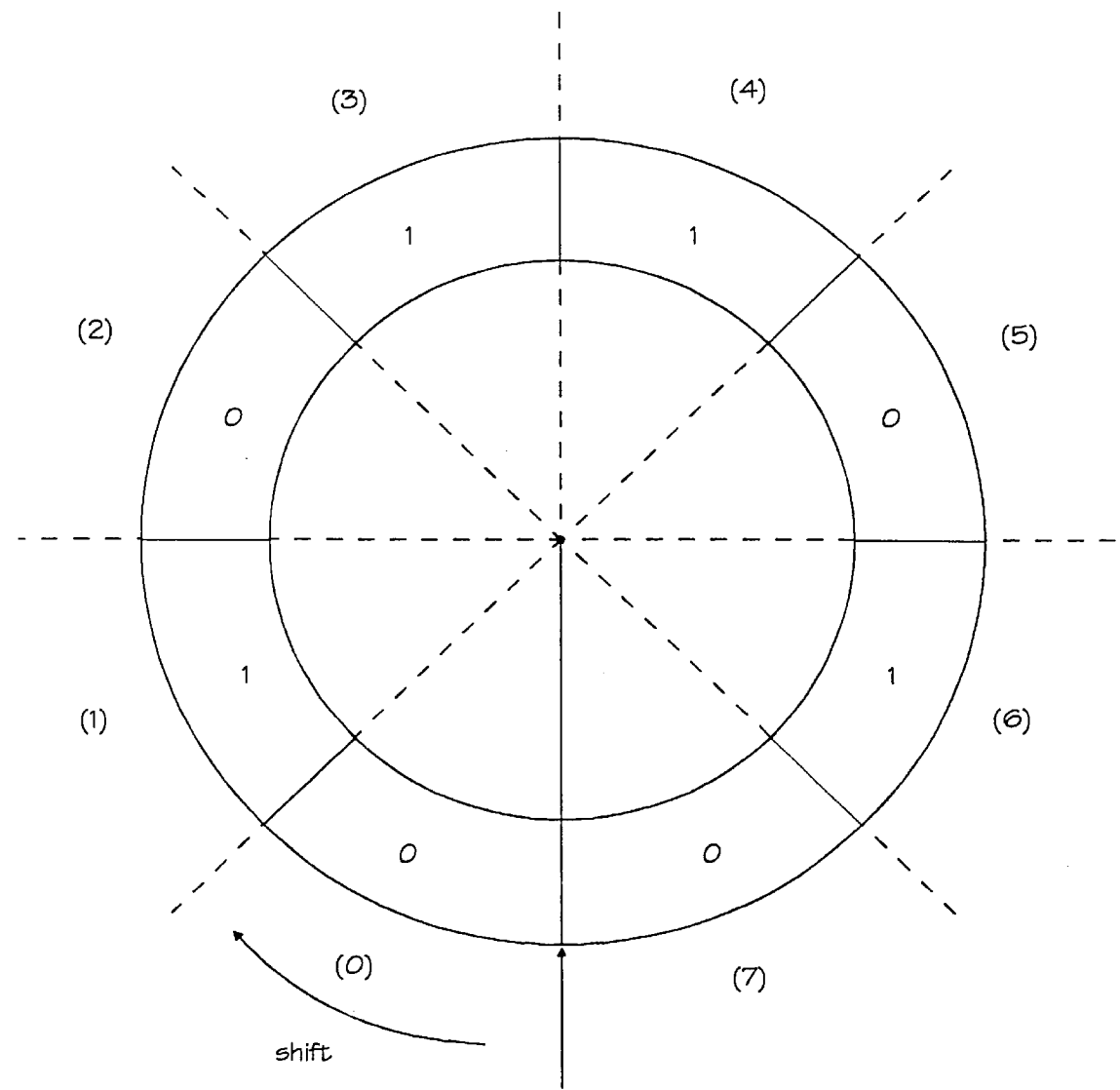
FIG. 3 is the circular spreading code of FIG. 2(*b*).

FIG. 3 shows the circular spreading code '01011010'. The rotation of the code corresponds to the multiple user bit value. Thus, if the code used is '01101001' then the original code was shifted by 2 and thus corresponds to a user value of '010'. Similarly, user values of zero to eight can be transmitted using different shifted versions of the circular spreading code.

Figure 4:
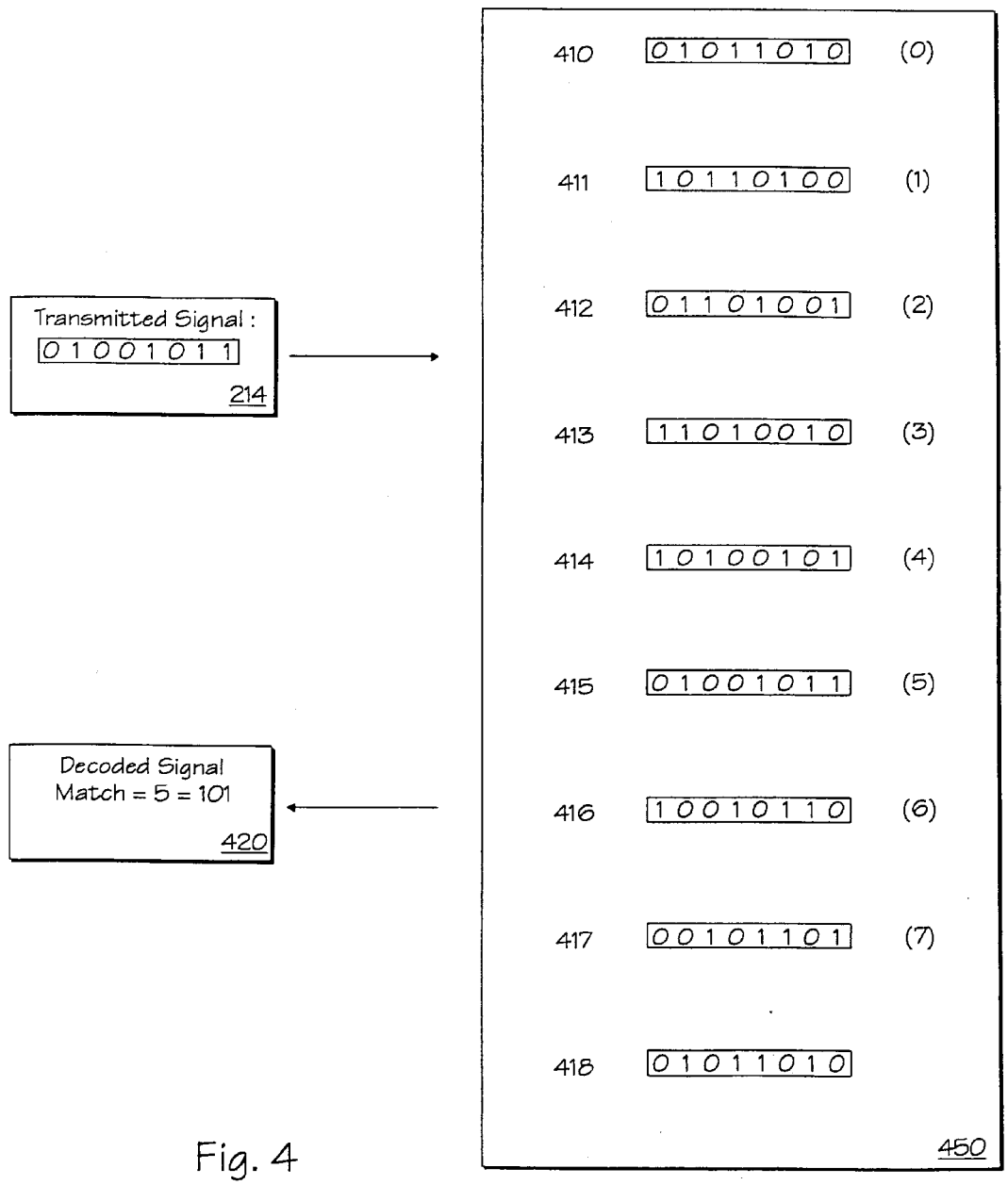
FIG. 4 is a block diagram of receiving and decoding the spread modulated signal of FIGS. 2(*b*) and 3.

FIG. 4 shows the receipt and decoding of the transmitted signal. When the transmitted signal 214 from FIG. 2(b) is received, it is compared to the correlators for that circular pseudo-noise spreading code (shown in FIG. 3) 418. Each correlator is the circular pseudo-noise spreading code 418 shifted by zero to seven bits where the value of the number of bits shifted equals the value of the transmitted signal. The transmitted signal may be compared to the correlators simultaneously. When a match is found then the value corresponding to the correlator (which corresponds to the number of bits shifted) is read. This value is the value of the original signal. In this manner, the signal is demodulated, or despread. Using the example of the transmitted signal '01001011', when it is compared with each correlator, it is found that it corresponds to correlator 415, where correlator 415 is circular pseudo-noise spreading code 418 shifted by five bits. Therefore the decoded signal 420 is equal to the numeric value '5' and in a binary signal is '101'.

In the example described above, an eight bit pseudo-noise code was used to transmit three bits of information. Of course, other values could be used. For example, to transmit 2 bits of information at a time, a four bit pseudo-noise code is required. Similarly, to transmit 4 bits of information, a 16-bit pseudo-noise code is required, to transmit 5 bits of information, a 32-bit pseudo-noise code is required, to transmit 6 bits of information, a 64-bit pseudo-noise code is required, etc.

What is claimed is:

1. A method, comprising:

spreading a first signal using a first circular pseudo-noise code generated by shifting an original pseudo-noise code by n, wherein the value of n is equal to the value of the first signal and wherein the value of first signal is not equal to zero.

2. The method of claim 1 wherein the first circular pseudo-noise code is used to spread signals to be transmitted to a first user.

3. The method of claim 2 wherein the first user is capable of decoding signals transmitted using the first circular pseudo-noise code.

4. The method of claim 1 further comprising:

creating a second circular pseudo-noise code orthogonal to the first circular pseudo-noise code.

5. The method of claim 4 wherein the second circular pseudo-noise code is used to spread signals to be transmitted to a second user.

6. The method of claim 5 wherein the second user is capable of decoding signals transmitted using the second circular pseudo-noise code.

7. A method, comprising:

spreading a first signal using a first circular pseudo-noise code generated by shifting an original pseudo-noise code by the value of the first signal; and spreading a second signal using a second circular pseudo-noise code generated by shifting the original pseudo-noise code by the value of the second signal, wherein the value of the first signal is different than the value of the second signal.

8. The method of claim 7 further comprising:

transmitting the first circular pseudo-noise code; and decoding the first circular pseudo-noise code to recover the first signal by comparing the first circular pseudo-noise code to a plurality of circular pseudo-noise codes stored in a plurality of correlators.

9. The method of claim 7 wherein spreading a first signal using a first circular pseudo-noise code includes generating the first circular pseudo-noise code by circularly shifting the original pseudo-noise code by n bits, wherein n is equal to the binary value of the first signal.

* * * * *